Dec. 23, 1958     L. J. STOFFER     2,865,283
METHOD OF FORMING DRY COMPRESSED COMPACT SPONGE UNIT
Filed March 30, 1955
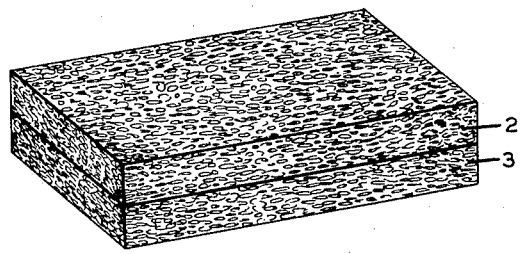
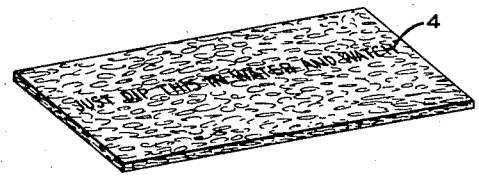
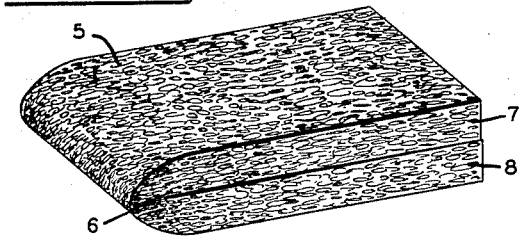
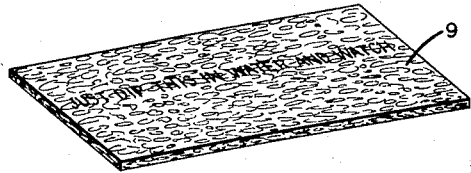
*INVENTOR.*
LEWIS J. STOFFER
BY
DES JARDINS, ROBINSON & KEISER
HIS ATTORNEYS

United States Patent Office 2,865,283
Patented Dec. 23, 1958

2,865,283

METHOD OF FORMING DRY COMPRESSED COMPACT SPONGE UNIT

Lewis J. Stoffer, Cincinnati, Ohio

Application March 30, 1955, Serial No. 497,962

2 Claims. (Cl. 100—40)

This invention relates to press-bonded compressible and expansible multiple layers of sponge products dry-pressed together into compact collapsed form with the sponge products press-bonded together to be packaged, handled, or transported in such form until ready for use or until wetted for returning or recovering such products to their normal expanded condition and separated from each other.

It particularly pertains to a single sponge folded upon itself in laminated layers or one or more separate sponges superimposed in layers to be compressed to a temporary compact collapsed form as an article of manufacture and sale in which the sponge products are collapsed and press-bonded together as a unit. The compressed unit is of boardlike or relatively stiff character although somewhat flexible.

Sponge sheets are more or less bulky to handle and store, and, accordingly, take up much more space than would be required if they were compressed and held in a compressed condition. When compressed and held in a compressed condition, they are boardlike in character. In this condition, they can be more conveniently handled, packaged and stored. Moreover, they are much less bulky in volume when compacted in a compressed condition. While a number of them have been stacked into a bundle and bound with some material to hold them bundled together, such requires some binding material which must need to be removed to release them. They have now been compressed in a dry state to be press bonded in that condition for being so handled as an article of manufacture and sale, and without the need of any binding material other than that provided by the products themselves in being press bonded together.

Accordingly, one of the main objects of the invention is in folding a single sponge or superimposing two or more sponges into a multiple of layers and compressing them into a dry compact collapsed unit.

Another object of the invention is a compressed dry compact mass of sponge products.

Another object of the invention is a dry compressed laminated sponge compact.

Still another object of the invention is the method of compressing a multiple of sponge layers into a dry laminated compact.

Further objects, and objects relating to details of construction and economies of operation, will readily appear from the detailed description to follow. In one instance, the objects of the invention have been accomplished by structure and means set forth in the following specification. The invention is clearly defined and pointed out in the appended claims. Structures constituting preferred embodiments of the invention, and their manufacture, are illustrated in the accompanying drawings, in which:

Fig. 1 is a perspective view of two rectangular sponges superimposed for being compressed into a compact laminated unit.

Fig. 2 is a perspective view of the dry compressed laminated compact embodying the invention.

Fig. 3 is a perspective view of a sponge sheet folded upon itself for being compressed into a compact laminated unit.

Fig. 4 is a perspective view of another embodiment of the invention formed from the folded sponge of Fig. 3.

The invention generally described pertains to a single sponge folded upon itself in a plurality of layers of two or more separate sponges superimposed in layers and compressed in a dry condition to a relative dense laminated compressed compact as an article of manufacture and sale with the layers press bonded together. When the unit is to be used, it is wetted with water to release the laminations of the single sponge or the separate sponges for them to revert and recover to their normal expanded sponge structure.

Referring specifically to the drawings in which like numerals designate like parts, numerals 2 and 3 (Figs. 1 and 2) are two sheets of sponge material which may be of any suitable conventional sponge material, such as sponge cloth made from cotton, rayon or other type fabric for wiping. Printed matter 4 may be placed upon the face of the sponge sheets, this being on the exposed face or the face which is concealed when the compressed laminated unit is formed.

The two sheets 2 and 3 are compressed in a dry condition under heavy pressure between platen plates or rolls, of any suitable compressing device, into a compact compressed condition, the pressure being sufficient to press bond the layers together and into their collapsed condition. The press bonded layers are a compacted collapsed unit which while somewhat flexible is boardlike in character. They are secured in this condition until wetted to be separated and reexpanded to their normal expanded condition. Accordingly, the compact laminated unit can be manufactured and sold as an article of manufacture to be so handled until ready for use, at which time it can be wetted.

The embodiment of Figs. 3 and 4 comprises a single sponge sheet 5 molded midway at 6 to bring the opposite free ends 7 and 8 in alinement. The folded sheet is then compressed, as are the two or more sheets 2 and 3 in Figs. 1 and 2, to form the compacted laminated unit 9 as an article of manufacture and sale. While the sponge has been folded midway to laminate the two half portions, it will, of course, be understood that the single sheet may be multiple folded to provide as many more laminations as desired.

From the foregoing description, it will be apparent that a single sponge sheet or two or more sheets can be temporarily compressed into a compact laminated unit as an article of manufacture and sale for convenient storage and handling until ready for use, when it can conveniently and easily be reverted to its natural condition ready for use.

It will be understood that there may be various changes in details of construction and arrangement for compacting the sponge sheet or sheets without departing from the spirit of the invention, and, therefore, the invention is claimed broadly as indicated by the appended claims.

Having thus described the invention, what is claimed as new and useful and desired to be secured by United States Letters Patent, is:

1. The method of forming a dry compressed compact sponge unit of relatively stiff character comprising superimposing layers of dry sponge sheet material to form a stack, and compressing said stack of superimposed layers, in a dry condition free from any added binding material, to collapse said stack and press-bond the layers together in a collapsed compact unit.

2. The method of claim 1 in which the layers are superimposed by folding over a single sponge sheet.

References Cited in the file of this patent

UNITED STATES PATENTS

| | | |
|---|---|---|
| 1,292,982 | Wolf | Jan. 28, 1919 |
| 2,204,202 | Zimmerman | June 11, 1940 |
| 2,659,935 | Hammon | Nov. 24, 1953 |
| 2,689,642 | Franke | Sept. 21, 1954 |

FOREIGN PATENTS

| | | |
|---|---|---|
| 6,082 | Great Britain | Dec. 5, 1912 |
| 539,785 | Great Britain | Sept. 24, 1941 |